United States Patent [19]

Bohó et al.

[11] Patent Number: 4,971,840
[45] Date of Patent: Nov. 20, 1990

[54] PROCEDURE FOR TREATMENT OF FIR-WOOD AND LEAF-WOOD

[75] Inventors: Róbert Bohó, Szentendrei ût 17, Budapest; István Pozsár, Budakalász; József Vékony, Szondy u. 98/a, Budapest, all of Hungary

[73] Assignees: Robert Boho; Jozsef Vekony, both of Budapest, Hungary

[21] Appl. No.: 422,514

[22] Filed: Oct. 17, 1989

[30] Foreign Application Priority Data

Jul. 3, 1989 [HU] Hungary ............................ 4459/87

[51] Int. Cl.$^5$ .............................................. B05D 3/10
[52] U.S. Cl. .................................... 427/397; 427/441; 427/416
[58] Field of Search ................ 427/397, 440, 441, 416

[56] References Cited

U.S. PATENT DOCUMENTS

| | | | |
|---|---|---|---|
| 4,786,326 | 11/1988 | Grove | 427/297 X |
| 4,839,099 | 6/1989 | Umehara et al. | 427/393 X |
| 4,913,972 | 4/1990 | Grunewalder et al. | 427/303 X |

*Primary Examiner*—Shrive Beck
*Assistant Examiner*—Alain Bashore
*Attorney, Agent, or Firm*—Herbert Dubno; Jonathan Myers

[57] ABSTRACT

This invention is concerned with methods for treating wet fir-woods or leaf-woods mainly for reduction of their moisture content and for preservation.

The procedure of the invention is conducted in two steps. In the first step, the wet wood is kept in a bath of molten paraffin or a mixture of paraffin with paraffin oil at weight ratios from 90:10 to 10:90 containing 0.05 to 5 percent by weight of colloidal silicon dioxide at 80° to 180° C. for 10 to 50 minutes.

In the second step, the wood is transferred into another bath of an emulsion consisting of 10 to 30 parts by weight of an aqueous urea/formaldehyde resin with solid content of 30 to 50 percent by weight in term of the solid content of the resin, 0.1 to 0.8 percent by weight of catalyst, 90 to 70 parts by weight of paraffin or a mixture of paraffin with paraffin oil at weight ratios from 90:10 to 10:90, and optionally 1 to 8 parts by weight of additives, preferably emulsifier, pigment, fungicide, and insecticide. The treatment is performed at 60° to 100° C. for 20 to 150 minutes. After the wood has been removed and the excess of liquid has drained off, the wood is kept at room temperature for 24 to 48 hours.

3 Claims, No Drawings

PROCEDURE FOR TREATMENT OF FIR-WOOD AND LEAF-WOOD

BACKGROUND OF THE INVENTION

This invention relates to methods for treatment of wet fir-woods or leaf-woods mainly for reducing the moisture content and for preservation.

Several procedures are known for woodenwares to reduce their moisture content, to prevent them from the posterior water absorption, or simply to preserve them.

The primeval method has been the storage at room temperature which is time-consuming and has a great want of space.

Another known method is to dry the wood by hot air in a closed room. This procedure has a high energy demand and requires supplementary treatment(s) for the protection against fungi and insects.

In a known procedure for the preservation of wood, a posterior fungus and insect control is performed by impregnation with thermoplastics-supported fungicides and/or insecticides (Technical Catalogue of Paints and Lacquers, BUDALAKK Paint and Resin Factory, Közgazdasági és Jogi Könyvkiadó (Publishing House for Economy and Right), Budapest, 1987, pp. 399–402). This method, however, is not suitable for reducing the moisture content of woods.

In Brit. Pat. No. 1,168,062 aqeous paraffin emulsion containing pentachlorophenol is recommended for treatment of woodenwares. Application of the emulsion is disadvantageous since it can not prevent a certain extent of posterior water absorption.

The disclosure Ger. No. 2,431,595 describes a particular fungicide- and insecticide-containing aqueous paraffin emulsion which is heat resistant and stable in storage due to a special emulsifier system. This is disadvantageous again as it does not prevent the posterior water absorption by the woodenwares.

The procedure described in the disclosure of Ger. Pat. No. 2,361,119 has a similar drawback as wood is treated here in a paraffin bath again, at 140° to 180° C.

SUMMARY OF THE INVENTION

It was aimed to develope a procedure for eliminating the disadvantages of the known methods wherein the woodenwares would be dewatered at a relatively low energy consumption, the posterior water absorption could be prevented while the mechanical properties of wood would even improve after the treatment.

The two-step procedure of the invention is as follows: In the first step, the wet wood is treated in a bath of paraffin or paraffin/paraffin oil mixture, 90:10 to 10:90 by weight, containing 0.05 to 5 percent by weight of colloidal silicon dioxide at 80° to 180° C. for 10 to 50 minutes. In the second step, the removed wood is immersed into another bath of an emulsion containing 10 to 30 parts by weight of an aqueous urea/formaldehyde resin with a solid content of 30 to 50 percent by weight, a catalyst at 0.1 to 0.8 percent by weight in term of the solid content of the resin, 90 to 70 parts by weight of paraffin or a paraffin/paraffin oil mixture at weight ratios from 90:10 to 10:90, and optionally 1 to 8 parts by weight of additives, preferably pigments, fungicides, insecticides, emulsifier; kept at 60° to 100° C. for 20 to 150 minutes. The wood is then removed from the bath, the excess of liquid is allowed to drip down and the treated wood is kept at room temperature for 24 to 48 hours.

DESCRIPTION OF THE PREFERRED EMBODIMENT(S)

The first step serves for the removal of the majority of the moisture content from the pores of the wet wood while the colloidal silicon dioxide content of the bath stays affixed as a thin coating of about a micrometer in the pores of wood.

In the second step, the residual moisture content is removed and the pores receive a coating of urea/formaldehyde resin which is cross-linkable at room temperature. Optionally, pigments, fungicides, and/or insecticides can also be introduced along with the resin.

The term pigment refers to oleophylic ones. Fungicide and insecticide mean preferably sodium pentachlorophenolate and phosphoric acid derivatives, respectively.

The impregnation process of the second step is followed by the cross-linking of the resin during the storage at room temperature.

The resin/paraffin emulsion used in the second step is prepared through an intensive dispersing operation, preferably in the presence of emulsifier(s) (such as salts of triethanol amine).

The emulsion is prepared in a separate vessel, such as in a centrifugal mixer, ultrasonic disperser, etc. The role of the colloidal silicon dioxide and of the urea/formaldehyde resin in the first and second baths, respectively, is to preserve wood and to prevent any posterior water absorption by virtue of their coating in the pores of wood.

The aqueous urea/formaldehyde resin used has a solid content from 48 to 52 percent by weight, pH from 7.1 to 8.5, free formaldehyde content of 8 percent by weight.

Preferably, an aqueous solution of ammonium chloride is admixed to the resin as catalyst. Before the emulsification, the aqueous resin solution is preferred to be diluted by 20 percent by weight of water in term of the resin solution then admixed by the catalyst, the emulsifier, and the molten paraffin or its mixture with paraffin oil.

As wood to be treated, both leaf-woods and tirwoods may be used in forms of saw-log or timber or even scrapings and chipboards. In the procedure of the invention, temperature and time of the treatments may be varied according to the quality of wood. Treatment and dewatering of the otherwise poorly tractable jackpine, a Canadian pine-tree, is still easy by the procedure of the invention.

The original moisture content of 30 to 60 percent by weight in wood is reduced to 8 to 10 percent by weight after the treatment of the invention.

The moisture content of wood treated in this way remains practically constant during storage.

The advantages of the procedure of the invention are as follows:

Equally suitable to treatment of a wide variety of woods (leaf-woods and tir-woods).

The moisture content of wood can be reduced from 30 to 60 percent by weight to 8 to 10 percent by weight on the account of a relatively low energy consumption.

No posterior water absorption; thus, wood treated by the procedure of the invention needs no special conditions when stored.

The mechanical properties, such as compression strength, of wood are improved by the treatment of the invention.

The treatment may also involve protection against fungi and insects or, optionally, colouration of wood.

The following examples are presented to the procedure of the invention:

EXAMPLE 1

Treatment of acacia beams with a moisture content of 40 percent by weight

Lump industrial paraffin (m.p.: 62° C.) was heated to 70° C. in an autoclave. One part by weight of colloidal silicon dioxide was added to 50 parts by weight of molten paraffin with continuous intensive stirring. As the mixture had been homogenized, 50 parts by weight of paraffin oil (density: 0.92 kg/m$^3$, product of Duna Petroleum Co. (DKV), Hungary) was added. The mixture was heated up to 100° C. with stirring and the acacia beams were immersed into the bath for 20 minutes then transferred into the second bath.

The bath in the second treating tub were prepared as follows: 80 parts by weight of paraffin was heated to 65° C. then 20 parts by weight of paraffin oil was admixed. The mixture was kept at 60° C. with continuous stirring while 20 parts by weight of urea/formaldehyde resin, diluted to a 40-percent by weight aqueous solution containing 0.1 part by weight of NH$_4$Cl in aqueous solution was added. The mixture was supplemented with 1 part by weight of a fatty alcohol polyglycol ether triethanolamine salt as emulsifier, dispersed intensively in a centrifugal mixer for 15 min and the emulsion was heated to 90° C. with continuous stirring followed by addition of 1 part by weight of the pigment Sudan-Braun (product of BASF, FRG). The emulsion was then transferred into the treating tub.

In the second bath, the acacia beams transferred from the first tub were treated at 85° C. for 20 min. After the treatment, the beams were removed and drained off. Finally, the beams were kept at 25° C. for 48 hours.

Moisture content of wood was measured with 20 mm×20 mm×300 mm specimens. The moisture content of treated wood was 8 percent by weight.

EXAMPLE 2

Treatment of lumps of spruce logs with a moisture content of 40 percent by weight The first bath of the treatment consisted of 100 parts by weight of molten paraffin at 120° C. containing 0.5 part by weight of colloidal silicon dioxide homogenized. The treatment at 120° C. took 30 minutes.

The bath in the second treating tub was identical in composition with that in Example 1 but 1 part by weight of Sudan-Braun was replaced by 4 parts by weight of the fungicide sodium pentachlorophenolate and 0.001 part by weight of malathion insecticide (0,0-dimethyl-S-(1,2-dicarbethoxyethyl)-dithiophosphate).

The treatment was performed at 95° C. for 30 min. Moisture content of the treated wood was reduced to 10 percent by weight.

EXAMPLE 3

(Comparative)

20 mm×20 mm×300 mm specimens were prepared in acacia-wood treated according to Example 1. The moisture content of treated wood was 8 percent by weight.

The specimens were kept in an environment at a relative humidity of 60 percent for 24 hours. The measured average water absorption was 0.1 percent by weight during this test.

Control specimens of 20 mm×20 mm×300 mm were made in the original acacia-wood having a moisture content of 40 percent by weight then dried at 105° C. until its moisture content had reduced to 8 percent by weight. As these control specimens were kept at a relative humidity of 60 percent for 24 hours, their moisture content increased to 22 percent by weight, i.e. the posterior water absorption was 14 percent by weight.

The control test was repeated with a treatment of the control specimen in the first bath of Example 1 under the said conditions. These partly treated samples showed a posterior water absorption of 6 percent by weight under the relative humidity of 60 percent for 24 hours.

It is obvious from this test that only the complete procedure of the invention is capable of preventing a notable posterior water absorption.

What is claimed is:

1. Procedure for treatment of wet fir-wood or leaf-wood in a bath containing paraffin or paraffin and paraffin oil at elevated temperature wherein, as a first step, the wet woods or woodwares are kept in a bath containing paraffin or a mixture of paraffin with paraffin oil at weight ratios from 90:10 to 10:90 and 0.05 to 5 percent by weight of colloidal silicon dioxide at 80° to 180° C. for 10 to 50 minutes then the wood is removed and, as a second step, immersed into another bath of an emulsion containing 10 to 30 parts by weight of an aqueous urea/formaldehyde resin with a solid content of 30 to 50 percent by weight, a catalyst at 0.1 to 0.8 percent by weight in term of the solid content of the resin, 90 to 70 parts by weight of paraffin or a mixture of paraffin with paraffin oil at weight ratios from 90:10 to 10:90, up to 8 wt % additive of an preferably emulsifier, pigment, fungicide, and insecticide, kept at 60° to 100° C. for 20 to 150 minutes, followed by the removal of the wood from the bath, draining the excess of liquid off and the treated wood is kept at room temperature for 24 to 48 hours.

2. The procedure of claim 1 wherein the wet wood is treated in a bath of a mixture of paraffin with paraffin oil at 90° to 110° C. for 10 to 30 minutes as a first step then, in the second step, the wood is transferred into another bath of an emulsion consisting of a catalyst-containing aqueous urea/formaldehyde resin besides the mixture of paraffin with paraffin oil, optionally supplemented by at least one pigment, kept at 80° to 90° C. for 30 to 150 minutes and the removed wood is stored at room temperature for 24 hours at least.

3. The procedure of claim 2 wherein the catalyst is ammonium chloride.

* * * * *